United States Patent
Chaanine et al.

(10) Patent No.: US 9,566,917 B2
(45) Date of Patent: Feb. 14, 2017

(54) ENCLOSURE FOR ENGINE WIRING HARNESS

(71) Applicant: Caterpillar Inc., Peoria, IL (US)

(72) Inventors: Joseph Y. Chaanine, Peoria, IL (US); Mitchell R. Adams, Dunlap, IL (US); Adam J. Fash, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 14/625,793

(22) Filed: Feb. 19, 2015

(65) Prior Publication Data

US 2016/0244003 A1   Aug. 25, 2016

(51) Int. Cl.
*H02G 3/04* (2006.01)
*B60R 16/02* (2006.01)

(52) U.S. Cl.
CPC ............. *B60R 16/0215* (2013.01); *H02G 3/04* (2013.01); *H02G 3/0487* (2013.01)

(58) Field of Classification Search
CPC .......... H02G 3/04; H02G 3/0487; H02G 3/32; H02G 3/34; B60R 16/0215
USPC ........... 248/67.5; 174/68.1, 68.3, 72 A, 72 R
See application file for complete search history.

(56) References Cited

U.S. PATENT DOCUMENTS

| | | |
|---|---|---|
| 5,203,292 A | 4/1993 | Motose |
| 5,964,491 A | 10/1999 | Marsh et al. |
| 6,049,040 A * | 4/2000 | Biles ............... H02G 3/0487 174/101 |
| 6,051,790 A | 4/2000 | Takeuchi et al. |
| 6,844,496 B2 | 1/2005 | Matsuda et al. |
| 8,124,887 B2 * | 2/2012 | Suzuki ............... B60R 16/0215 174/481 |
| 9,029,700 B2 * | 5/2015 | Hara ............... B60R 16/0215 174/68.1 |
| 9,102,282 B2 * | 8/2015 | Takata ............... B60R 16/0215 |
| 9,120,435 B2 * | 9/2015 | Shirey ............... B60R 16/0215 |
| 2002/0116795 A1 | 8/2002 | Nelson |
| 2011/0147540 A1 | 6/2011 | Rivara et al. |
| 2013/0160246 A1 | 6/2013 | Hajduch |

* cited by examiner

*Primary Examiner* — Todd M Epps

(74) *Attorney, Agent, or Firm* — Derek Somogy; Cynthia-Clare Martey

(57) ABSTRACT

An enclosure for an engine wiring harness includes a first enclosure member and a second enclosure member that is substantially similar to the first enclosure member. The first and second enclosure members each have an upper edge, a lower edge, and an intermediate portion extending between the upper edge and the lower edge. The first and second enclosure members are assembled together with the upper edges in contacting engagement and with the lower edges in contacting engagement. The assembled enclosure defines a passageway for receiving at least a portion of the engine wiring harness, a first opening in communication with the passageway, a second opening in communication with the passageway, and an attachment assembly for securing the enclosure to an engine.

15 Claims, 6 Drawing Sheets

ENCLOSURE FOR ENGINE WIRING HARNESS

TECHNICAL FIELD

This disclosure relates to engine wiring harnesses, and more particularly, to enclosures for engine wiring harnesses.

BACKGROUND

Engine wiring harnesses provide electricity to, and communicate signals between, electrical components of, or associated with, an engine. Engine wiring harnesses typically include multiple wires, with individual branches of the engine wiring harness being for distinct purposes. For example, some branches of an engine wiring harness may provide electricity to components that require it, such as electrically-actuated injectors. Other branches of the engine wiring harness may communicate signals, such as signals originating at a sensor that are communicated to an engine control module.

Engine wiring harnesses are positioned external to the engine block and head, and may be secured to the engine in some instances. For example, U.S. Pat. No. 5,203,292 relates to a wiring arrangement for electric parts of an outboard motor. The '292 patent discloses a cover that is secured to an engine, with various electrical connections being contained within the cover. These electrical connections within the cover are joined via connectors to wires that service electrical components. The shape and configuration of the cover is designed to correspond with the shape of the electrical connections contained within the cover, however, and not all engines use a wiring arrangement like in the '292 patent. Therefore a need remains for improvements relating to engine wiring harnesses.

SUMMARY OF THE INVENTION

According to an aspect of this disclosure, an enclosure is provided for an engine wiring harness. The enclosure includes a first enclosure member and a second enclosure member that is substantially similar to the first enclosure member. The first and second enclosure members each have an upper edge, a lower edge, and an intermediate portion extending between the upper edge and the lower edge. The first and second enclosure members are assembled together with the upper edges in contacting engagement and with the lower edges in contacting engagement. The assembled enclosure defines a passageway for receiving at least a portion of the engine wiring harness, a first opening in communication with the passageway, a second opening in communication with the passageway, and an attachment assembly for securing the enclosure to an engine.

According to another aspect of this disclosure, an assembly is provided and includes an engine wiring harness and an enclosure formed of a first enclosure member and a second enclosure member substantially similar to the first enclosure member. The enclosure extends along a length direction between a first end and a second end, and defines a first opening at the first end, a second opening at the second end, and a passageway extending between the first opening and the second opening. The passageway is configured to receive at least a portion of the engine wiring harness, and the enclosure further defines an attachment assembly for securing the enclosure to an engine.

According to another aspect of this disclosure, a method is provided and includes positioning at least a portion of an engine wiring harness in a passageway of an enclosure. The enclosure includes a first enclosure member and a second enclosure member substantially similar to the first enclosure member.

BRIEF DESCRIPTION OF THE DRAWINGS

FIG. 2A is an enlarged view of a portion of FIG. 2.

DETAILED DESCRIPTION

Figure 1:
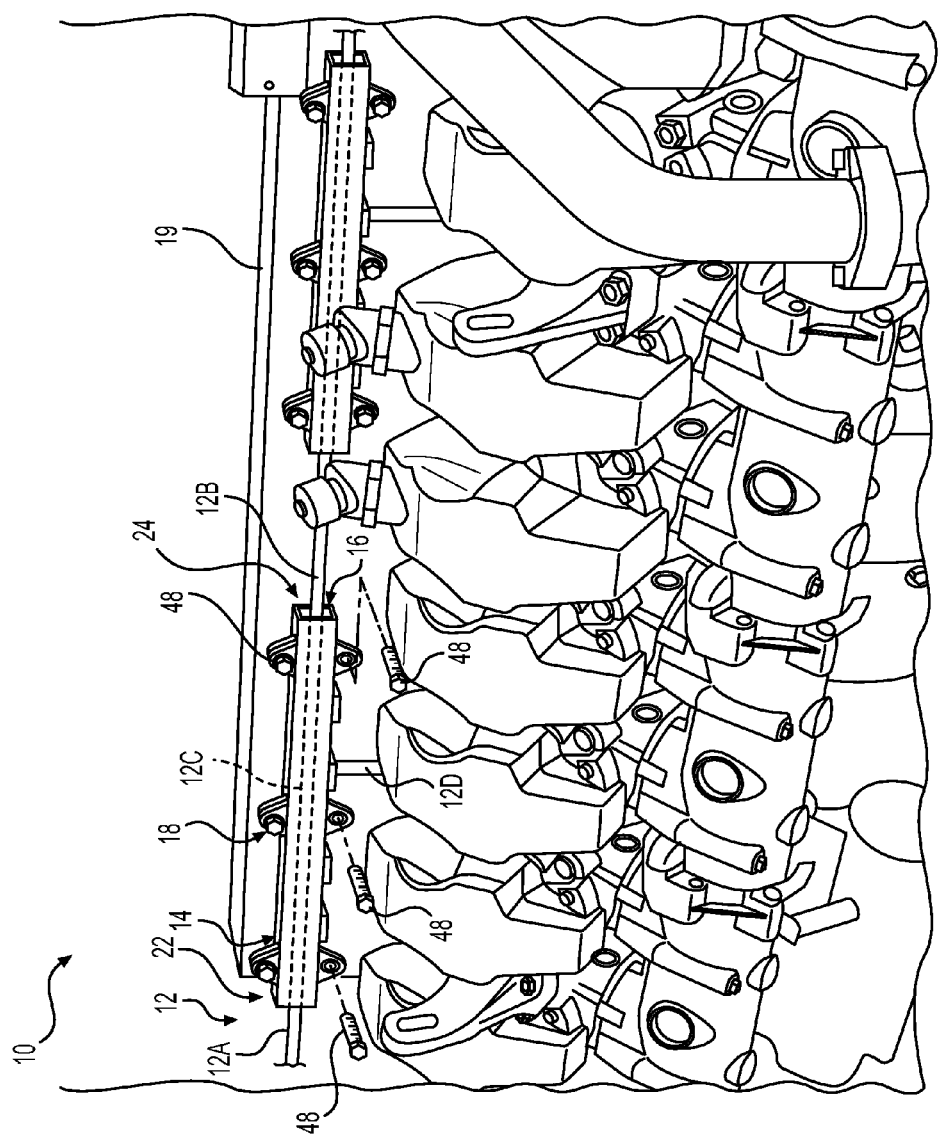
FIG. 1 is an isometric view showing an engine, an enclosure secured to the engine, and an engine wiring harness, a portion of which is received in the enclosure.

Referring to the figures and beginning with FIG. 1, an engine 10 is shown, such as the type that may be used with a machine. For example, the engine 10 may configured to operate on gasoline, natural gas, diesel, blends thereof, or any other appropriate fuel. An engine wiring harness 12 is associated with the engine 10, and is an assembly that includes a plurality of wires for providing service to various electrical components of, or associated with, the engine 10. For example, the engine wiring harness 12 may provide electricity to injector components of the engine 10, communicate signals from sensor components of the engine 10, and provide electricity to or communicate signals from other components that may be situated nearby the engine 10.

The engine wiring harness 12 is at least partially contained in an enclosure 14. In particular, the enclosure 14 is generally hollow and includes, or defines, a passageway 16, and at least a portion of the engine wiring harness 12 is received in the passageway 16. The enclosure 14 includes an attachment assembly 18 which is used to secure the enclosure 14 to the engine 10. For example, the enclosure 14 may be secured directly to the engine 10. Thereby, the engine wiring harness 12 may be supported in close proximity to the engine 10 and the electrical components that are serviced by the engine wiring harness 12.

As shown in FIG. 1, the enclosure 14 is secured to the head 19 of the engine 10, but it will be appreciated that the enclosure could also be secured to other structures or locations on the engine 10, or to structures nearby the engine 10. Additionally, while a single enclosure 14 is shown, multiple enclosures 14 could also be used with the engine 10, with different regions of the engine wiring harness 12 being at least partially contained in each enclosure 14.

Figure 2:
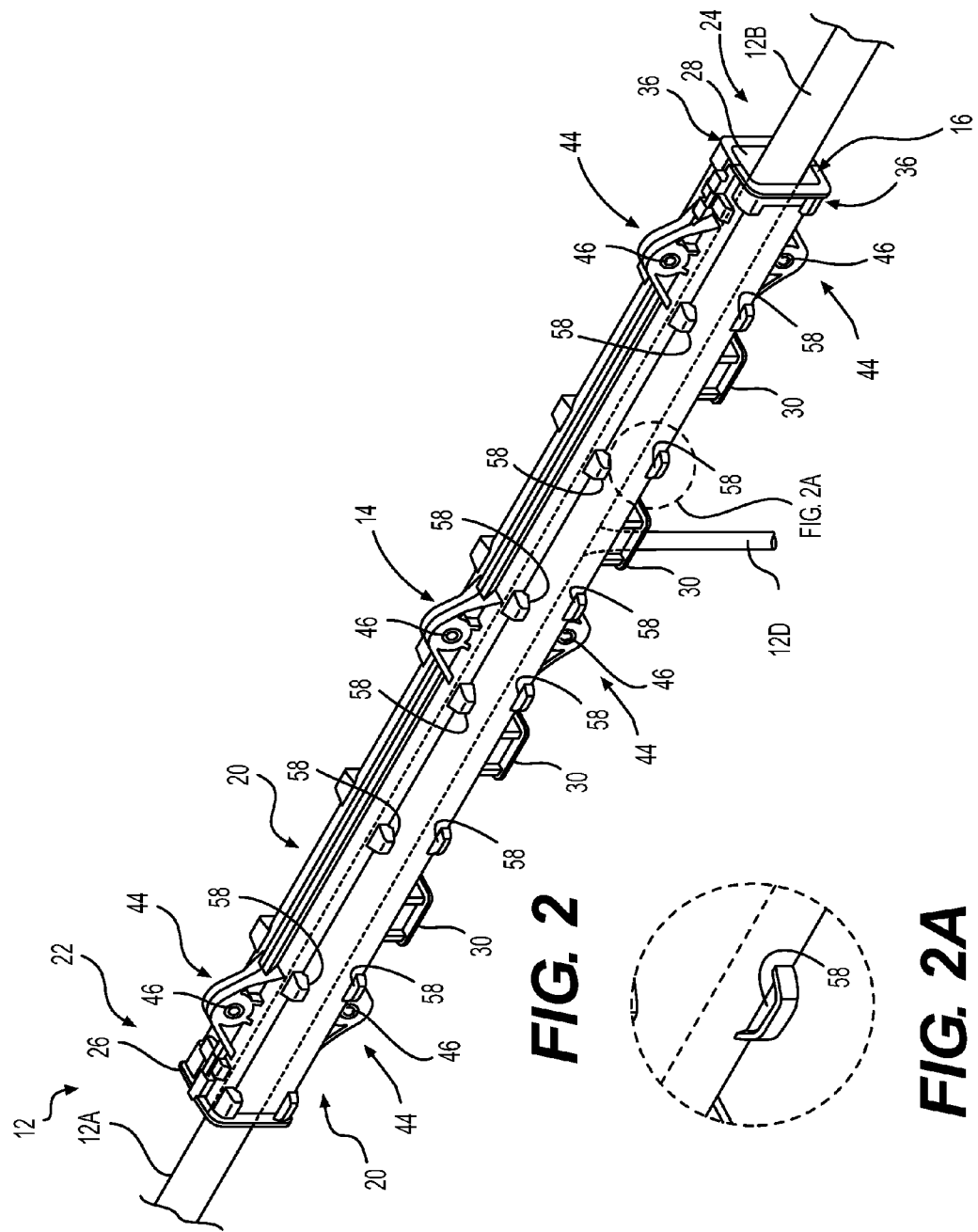
FIG. 2 is an isometric view showing the enclosure and a portion of the engine wiring harness of FIG. 1.
Figure 3:
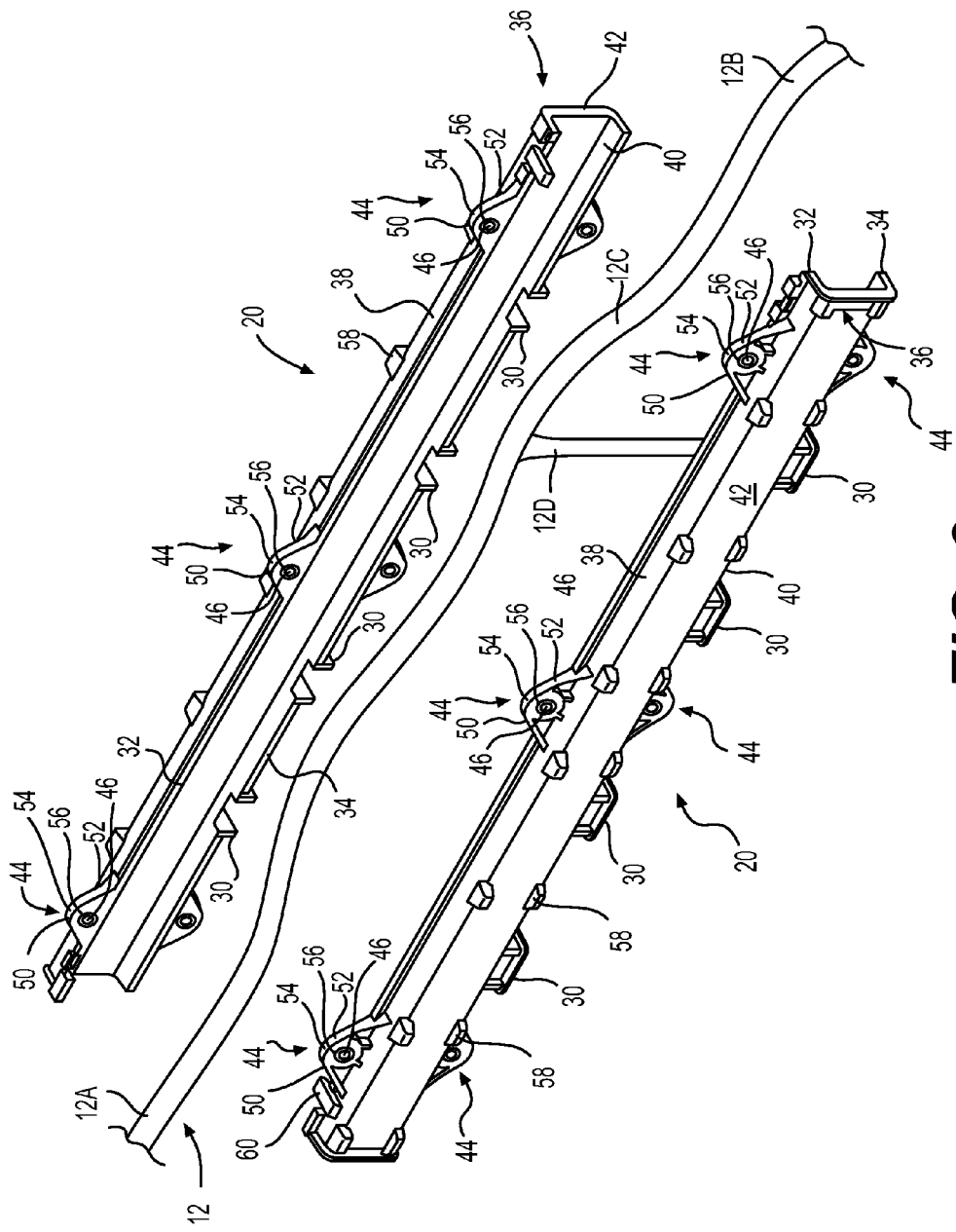
FIG. 3 is an exploded view of the subject matter of FIG. 2.

Referring next to FIGS. 2-6, the enclosure 14 is formed of a pair of similar, or substantially similar, enclosure members 20. The enclosure members 20 are assembled together to form the enclosure 14, and at least a portion of the engine wiring harness 12 is positioned in the passageway 16 (FIGS. 2 and 3). The passageway 16 is defined in the space generally between the enclosure members 20.

The enclosure 14 extends along a length direction between a first end 22 and a second end 24. The enclosure 14 defines a first opening 26 at the first end 22, and a second opening 28 at the second end 24. The first and second openings 26, 28 each communicate with the passageway 16, which extends between the openings 26, 28. Thereby, the enclosure 14 has a generally hollow construction between the ends 22, 24.

The enclosure 14 may also define one or more intermediate openings 30 between the first and second openings 26, 28, each of which communicates with the passageway 16. In the embodiment shown, there are four intermediate openings 30 (FIGS. 4 and 5), but other numbers of intermediate openings 30 could be used. The openings 26, 28, 30 serve to allow different branches of the engine wiring harness 12 to be directed into, or out of, the enclosure 14 (FIGS. 2 and 3).

As shown in FIGS. 2 and 3, a first branch 12A of the engine wiring harness 12 extends out of the passageway 16 through the first opening 26 at the first end 22, and a second branch 12B of the engine wiring harness 12 extends out of the passageway 16 through the second opening 28 at the second end 24. A third branch 12C of the engine wiring harness 12 extends within the passageway 16 between the openings 26, 28, and is connected with the first and second branches 12A, 12B. Thereby, the third branch 12C is a portion of the engine wiring harness 12 that is received in the passageway 16. As shown, the third branch 12C is substantially enclosed within, or inside, the enclosure 14. A fourth branch 12D of the engine wiring harness 12 extends out of one of the intermediate openings 30, and is also connected with the third branch 12C. It will be appreciated, however, that the enclosure 14 may be used with engine wiring harnesses having other configurations.

Each enclosure member 20 has an upper edge 32, a lower edge 34, and an intermediate portion 36 that extends between the upper edge 32 and the lower edge 34. When the enclosure members 20 are assembled together to form the enclosure 14, the respective upper edges 32 and lower edges 34 are in contacting engagement. The passageway 16 is generally defined inside the intermediate portions 36 of the two enclosure members 20.

Figure 6:
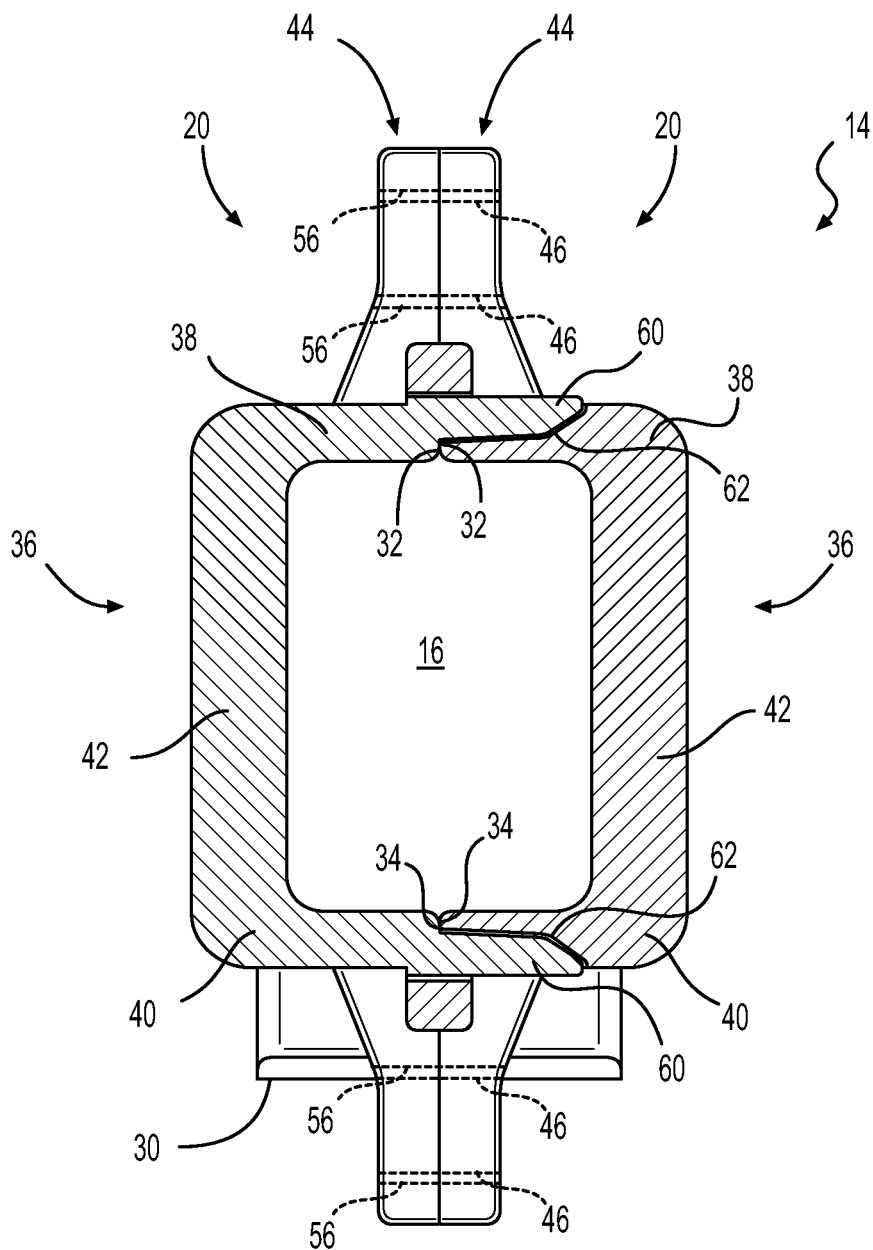
FIG. 6 is an end view of the enclosure of FIG. 4.

As shown in FIG. 6, the enclosure members 20 may have a substantially c-shaped profile in transverse cross section (transverse to the lengthwise extent of an enclosure member 20). Each intermediate portion 36 includes an upper segment 38, a lower segment 40, and a connecting segment 42 between the upper and lower segments 38, 40. The upper edge 32 is part of the upper segment 38, and the lower edge 34 is part of the lower segment 40. In the embodiment shown, the upper and lower segments 38, 40 each extend generally perpendicular with the connecting segment 42, thereby giving the enclosure member 20 its substantially c-shaped profile. Also in the embodiment shown, the upper and lower edges 32, 34 extend in substantially the same plane.

Each enclosure member 20 includes one or more attachment tabs 44, and each attachment tab 44 has a bore 46. The attachment tabs 44 of the two enclosure members 20 cooperate to form the attachment assembly 18. In particular, the bores 46 of the respective attachment tabs 44 are aligned and receive an attachment member 48 therethrough. For example, and as shown in FIG. 1, an attachment member 48 may extend through the bores 46 of the attachment tabs 44 for securing the enclosure 14 to the engine 10. The attachment member 48 may be a bolt that is received in a socket formed in the engine 10.

Figure 4:
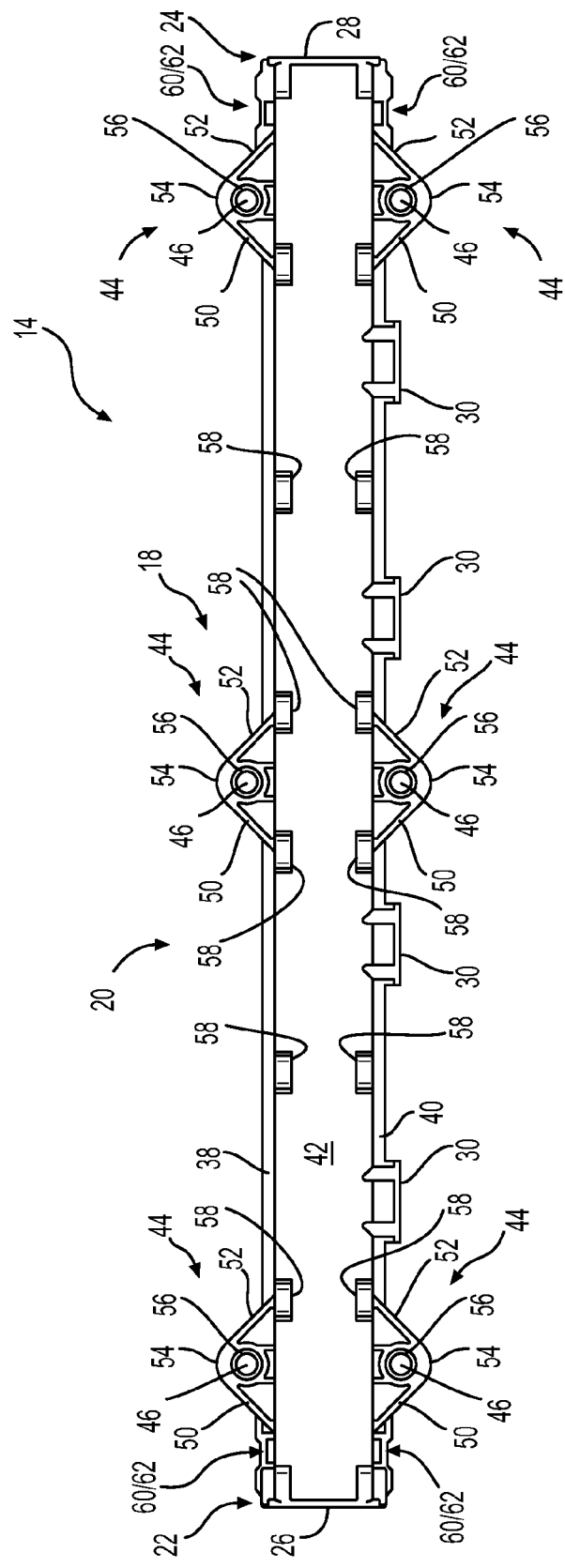
FIG. 4 is a side view showing an enclosure, without an engine wiring harness.
Figure 5:
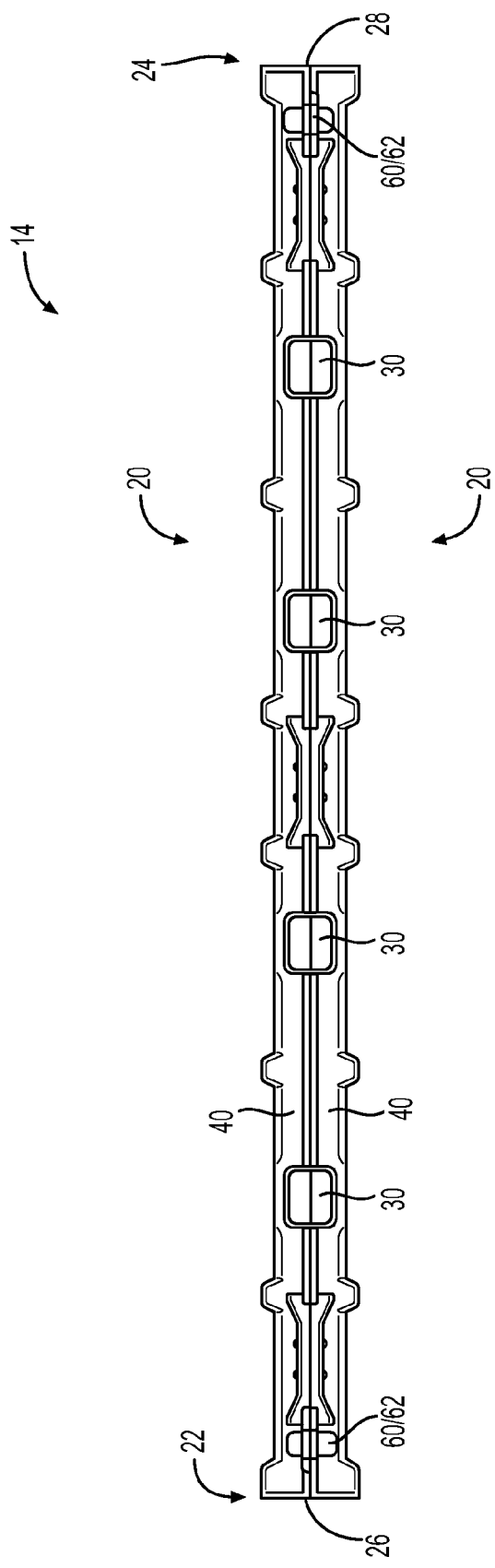
FIG. 5 is a bottom view of the enclosure of FIG. 4.

The attachment tabs 44 extend generally from the intermediate portion 36 of an enclosure member 20. For example, the attachment tabs 44 may extend generally upwardly from the upper segment 38, generally downwardly from the lower segment 40, or both. In the embodiment shown, there are six attachment tabs 44 per enclosure member 20, with three extending from the upper segment 38 and three extending from the lower segment 40. As shown in FIG. 4, each attachment tab 44 includes a first linear segment 50, a second linear segment 52, and a curved segment 54 between the linear segments 50, 52. The linear segments 50, 52 of the attachment tabs 44 extend at acute angles from the upper segment 38 or the lower segment 40. The attachment tabs 44 thereby have a generally rounded triangular shape, with the bore 46 of each being generally centrally located between the segments 50, 52, 54.

Each attachment tab 44 may further include a torque limiter 56 that surrounds the bore 46. The torque limiter 56 may prevent the attachment tab 44 from being crushed or damaged as the attachment member 48 is used to secure the enclosure 14 to the engine 10. For example, and as shown, the torque limiter 56 may take the form of a sleeve bushing.

The enclosure members 20 may also include one or more pairs of slots 58 for receiving a tie-down strap (not shown) to secure the engine wiring harness 12 to an enclosure member 20. As shown in FIG. 4, the slots 58 are defined in the intermediate portion 36 of the enclosure member 20. In particular, the slots 58 may be defined in the connecting segment 42 of the intermediate portion 36, with one slot 58 being located generally near the upper segment 38 and the other slot 58 being located generally near the lower segment 40. The enclosure member 20 may extend or protrude in the region of the slots 58, such that the slots 58 (of each pair of slots) generally face each other. A tie-down strap may be inserted through one slot 58, around the engine wiring harness 12, and back through the other slot 58 to secure the engine wiring harness 12.

Each enclosure member 20 may also include one or more mating tabs 60 and one or more mating receptacles 62, with the mating tabs 60 of one enclosure member 20 cooperating with the mating receptacles 62 of the other enclosure member 20 to hold the enclosure members 20 together. As shown in FIG. 3, each enclosure member includes two mating tabs 60, one of which extends outwardly beyond the upper edge 32 and one of which extends outwardly beyond the lower edge 34. Correspondingly, each enclosure member 20 includes two mating receptacles 62, one of which extends inwardly from the upper edge 32 and one of which extends inwardly from the lower edge 34. When the enclosure members 20 are assembled together, the mating tabs 60 are received in the mating receptacles 62 and the interaction between the mating tabs 60 and the mating receptacles 62 hold the first and second enclosure members 20 together. The mating tabs 60 and mating receptacles 62 may include hook and latch structures for locking the mating tabs 60 and mating receptacles 62 together.

The enclosure 14, including its enclosure members 20, may be formed of any suitable material. For example, some or all of the features of the enclosure members 20 may be formed of a plastic material, such as nylon 6/6 which may include 30% fiberglass fill. Also, some of the features of the enclosure members 20 may be formed of other materials, such as the torque limiters 56 being metal.

Advantageously, because the enclosure 14 is formed of two enclosure members 20 that are similar, or substantially similar, the number of parts required for the enclosure 14 is minimized. Thereby, the manufacturing costs associated with the enclosure 14 may also be minimized.

The enclosure 14 may be used with the engine 10 and the engine wiring harness 12 as follows. At least a portion of the engine wiring harness 12 is positioned in the passageway 16 of the enclosure 14. For example, the enclosure 14 may be assembled together around a portion of the engine wiring harness 12, with the enclosure members 20 being brought together with the portion of the engine wiring harness 12 therebetween.

The upper edge 32 of one enclosure member 20 is positioned in contacting engagement with the upper edge 32 of the other enclosure member 20. Also, the lower edge 34 of one enclosure member 20 is positioned in contacting engagement with the lower edge 34 of the other enclosure member 20. Further, the mating tabs 60 of one enclosure member 20 may cooperate with the mating receptacles 62 of the other enclosure member 20 to hold the enclosure members 20 together. The attachment tabs 44 of the respective enclosure members 20 cooperate to form the attachment assembly 18 of the enclosure 14. In particular, the bores 46 of the attachment tabs 44 are aligned for receiving the attachment members 48 therethrough.

The various branches of the engine wiring harness 12 are arranged as desired with respect to the openings 26, 28, 30 of the enclosure 14. For the embodiment shown, the engine wiring harness 12 is arranged so that the third branch 12C extends within the passageway 16, with the first and second branches 12A, 12B extending out through the first and second openings 26, 28, respectively, and with the fourth branch 12D extending out through the intermediate opening 30.

The enclosure 14 having a portion of the engine wiring harness 12 received in the passageway 16 is secured to the engine 10. For example, the enclosure 14 may be secured directly to the engine 10, with attachment members 48 extending through the bores 46 of the attachment tabs 44 of the attachment assembly 18 and securing directly to the engine 10. The torque limiters 56 may prevent the attachment members 48 from crushing or damaging the attachment tabs 44. Optionally, a tie-down strap may be inserted through a pair of slots 58 for securing the engine wiring harness 12 to the enclosure 14.

INDUSTRIAL APPLICABILITY

As will be evident from the foregoing description, the enclosure 14 is generally applicable for receiving at least a portion of a wiring harness and for being secured to an engine. For example, the enclosure 14 may be used with an engine associated with a machine. Also, the enclosure 14 may be used with engine wiring harnesses of various configurations and may be secured directly to an engine. Advantageously, the enclosure 14 is formed of a pair of similar, or substantially similar, enclosure members 20.

What is claimed is:

1. An enclosure for an engine wiring harness, the enclosure comprising:
a first enclosure member having an upper edge, a lower edge, and an intermediate portion extending between the upper edge and the lower edge,
a second enclosure member substantially similar to the first enclosure member and having an upper edge, a lower edge, and an intermediate portion extending between the upper edge and the lower edge,
the first and second enclosure members being assembled together with the upper edges in contacting engagement and with the lower edges in contacting engagement so as to define:
a passageway for receiving at least a portion of the engine wiring harness,
a first opening in communication with the passageway,
a second opening in communication with the passageway, and
an attachment assembly for securing the enclosure to an engine;
the first enclosure member including an attachment tab having a bore, and the second enclosure member including an attachment tab having a bore,
the attachment tabs of the first and second enclosure members cooperating to form the attachment assembly, wherein the bores of the first and second enclosure members are aligned for receiving an attachment member therethrough, and each attachment tab further including a torque limiter surrounding the respective bore.

2. The enclosure for an engine wiring harness of claim 1, each attachment tab including first and second linear segments extending from a respective intermediate portion, and a curved segment between the first and second linear segments.

3. An enclosure for an engine wiring harness, the enclosure comprising:
a first enclosure member having an upper edge, a lower edge, and an intermediate portion extending between the upper edge and the lower edge,
a second enclosure member substantially similar to the first enclosure member and having an upper edge, a lower edge, and an intermediate portion extending between the upper edge and the lower edge,
the first and second enclosure members being assembled together with the upper edges in contacting engagement and with the lower edges in contacting engagement so as to define:
a passageway for receiving at least a portion of the engine wiring harness,
a first opening in communication with the passageway,
a second opening in communication with the passageway, and
an attachment assembly for securing the enclosure to an engine;
the first and second enclosure members each including a pair of slots in the respective intermediate portion for receiving a tie-down strap.

4. The enclosure for an engine wiring harness of claim 1 or claim 3, the first and second enclosure members having a substantially c-shaped profile in transverse cross section.

5. The enclosure for an engine wiring harness of claim 1 or claim 3, the first and second enclosure members each further including a mating tab and a mating receptacle, the mating tab of the first enclosure member and the mating receptacle of the second enclosure member cooperating to hold the first and second enclosure members together.

6. The enclosure for an engine wiring harness of claim 1 or claim 3, the first and second enclosure members being assembled together so as to further define an intermediate opening between the first and second openings and in communication with the passageway.

7. An assembly, comprising:
an engine wiring harness, and
an enclosure formed of a first enclosure member and a second enclosure member substantially similar to the first enclosure member, the first enclosure member including an attachment tab having a bore, and the second enclosure member including an attachment tab having a bore,
the attachment tabs of the first and second enclosure members cooperating to form the attachment assembly, wherein the bores of the first and second enclosure members are aligned for receiving an attachment member therethrough; and each attachment tab further including a torque limiter surrounding the respective bore;

the enclosure extending along a length direction between a first end and a second end, and defining a first opening at the first end, a second opening at the second end, and a passageway extending between the first opening and the second opening, the passageway being configured to receive at least a portion of the engine wiring harness, and the enclosure further defining an attachment assembly for securing the enclosure to an engine.

8. The assembly of claim 7, wherein at least a portion of the engine wiring harness is positioned in the passageway of the enclosure.

9. The assembly of claim 7, further comprising:

an engine.

10. The assembly of claim 7, wherein the enclosure is secured to the engine.

11. The assembly of claim 10, wherein at least a portion of the engine wiring harness is positioned in the passageway of the enclosure.

12. The assembly of claim 7, each attachment tab including first and second linear segments extending from a respective intermediate portion, and a curved segment between the first and second linear segments.

13. The assembly of claim 7, the first and second enclosure members having a substantially c-shaped profile in transverse cross section.

14. The assembly of claim 7, the first and second enclosure members each further including a mating tab and a mating receptacle, the mating tab of the first enclosure member and the mating receptacle of the second enclosure member cooperating to hold the first and second enclosure members together.

15. The assembly of claim 7, the enclosure further defining an intermediate opening between the first and second openings and in communication with the passageway.

* * * * *